UNITED STATES PATENT OFFICE.

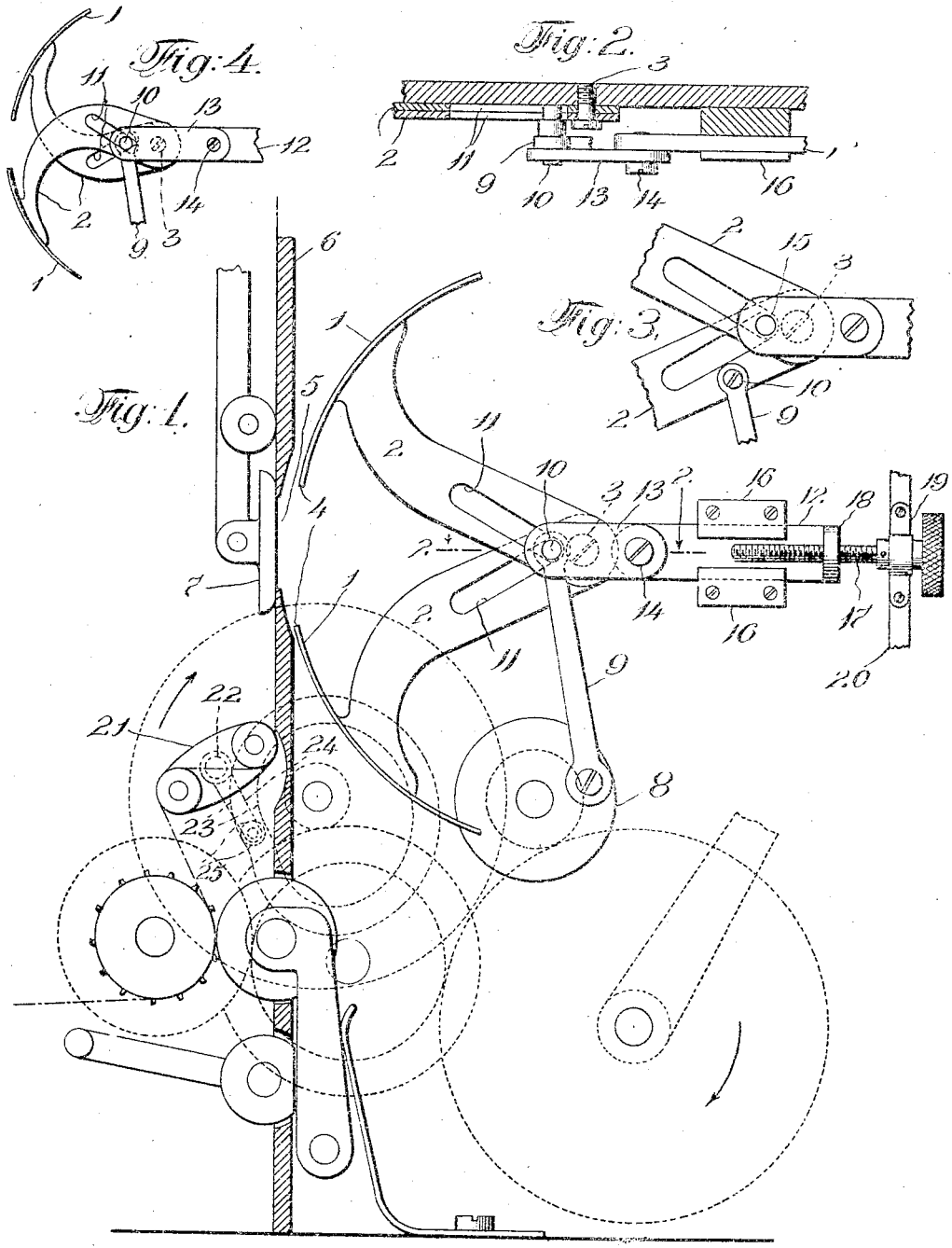

GEORGE W. BINGHAM, OF BROOKLYN, NEW YORK.

SHUTTER FOR MOVING-PICTURE CAMERAS.

1,129,327.      Specification of Letters Patent.      Patented Feb. 23, 1915.

Application filed December 15, 1910. Serial No. 597,429.

*To all whom it may concern:*

Be it known that I, GEORGE W. BINGHAM, a citizen of the United States, and a resident of the borough of Brooklyn, in the county of Kings, city and State of New York, have invented certain new and useful Improvements in Shutters for Moving-Picture Cameras, of which the following is a specification.

In the taking of the so-called "moving pictures", I have found that the best results are obtained by exposing the pictures "progressively" instead of all at once (the latter being the usual way).

The object of the present invention is to provide improved and simplified, as well as more efficient mechanism for securing this progressive exposure of the pictures. I accomplish this object by means of a shutter having a light aperture therein, the shutter being moved so that this light aperture will pass across the face of the film framed in the exposure opening of the camera. This shutter is preferably reciprocated or oscillated past the exposure opening and the timing of the parts is preferably such that the shutter will move in one direction to expose one picture and then in the opposite direction to expose the next picture. For this purpose the shutter may be given an up and down movement, and the film will be shifted by suitable means, one picture at a time, after each movement of the shutter.

Another object of my invention is to adjust the shutter to varying light conditions. This object I attain by regulating the size of the light aperture in the shutter. As a preferred way of accomplishing this result, I preferably make the shutter of two blades which are spaced apart to provide a light aperture between them, the two blades having a bodily movement past the exposure opening and a regulatable movement toward each other to adjust the size of the light aperture.

Various other features of the invention will appear as the specification proceeds.

In the accompanying drawings I have illustrated several preferred embodiments of the invention, but I would have it understood that various changes and modifications may be made therein without departing from the spirit and scope of the invention.

In the drawings: Figure 1 is a view in elevation of a preferred form of my invention, certain of the parts of the camera being shown in section, and other parts being represented diagrammatically. Fig. 2 is a detail sectional view taken on the line 2—2 of Fig. 1. Fig. 3 is a broken elevation of a slightly modified form of the invention. Fig. 4 is a view of another modification.

The same reference characters refer to like parts throughout the several views.

In its preferred form the shutter is made up of two shutter blades 1, carried by shutter arms 2 which are pivoted on a common center 3. The movement of the shutter may be either a reciprocating or an oscillating one, and in the drawings I have shown the latter form. The two shutter blades are spaced apart so as to provide a light aperture 4 between the adjacent edges of the blades, and the shutter as a whole is so shifted with respect to the exposure opening 5 of the machine that, in the movement of the shutter, the light aperture will pass across the face of the film framed in the exposure opening. This exposure opening may be formed in the partition or wall 6 of the machine, and the film will preferably be backed up by a door or clamping member 7, this member serving to properly hold the film with respect to the exposure opening.

The means for operating the shutter may vary, but I prefer to employ for this purpose a crank disk 8 and a connecting rod 9, the said connecting rod carrying at its upper end a wrist pin 10 in engagement with either one or both of the shutter arms 2. In Fig. 1 this wrist pin is shown as engaging both of the shutter arms, it being engaged in intersecting slots 11 in the respective arms, while in Fig. 3 this wrist pin is shown as being secured direct to one of the shutter arms (the lower one in this instance).

It will be obvious that by adjusting the shutter blades toward or away from each other, the size of the light aperture may be regulated at will to suit different light conditions. I have illustrated in the drawings a preferred mechanism for accomplishing this adjustment, but this means is capable of many modifications and I therefore do not wish to be limited to this particular form of adjusting mechanism. The adjusting means illustrated consists of a movable member 12 having an extension 13 pivotally connected thereto at the point 14. This pivoted extension carries a pin or projection which engages in the intersecting slots of the shutter arms. This pin may be the wrist pin itself, as illustrated in Fig. 1, but when the wrist pin is connected direct to one of the shutter arms, as in Fig. 3, then an independent pin 15 will have to be employed. The movable member is suitably mounted, as by being engaged in the guiding members 16. From this it will be clear that when the movable member is moved inward, the connecting pin will be pushed inward in the intersecting slots, thereby drawing the shutter blades closer together. A reverse movement will widen the light aperture between the blades. The movable member may be shifted by any suitable means, and in the present instance this means is shown in the form of a screw 17 engaged in a lug 18 on the movable member, the screw being held against longitudinal movement in a bearing 19 which may be carried in the front wall 20 of the machine.

Any suitable gearing may be employed for operating the various parts of the machine. In Fig. 1 these gears are indicated in dotted lines. Suitable means will be employed for intermittently advancing the film. In the drawings this film advancing means is shown in the form of a double-ended member 21 over which the film passes, as indicated, and which in itself is pivoted to rock on the center 22 located between its ends. A cam 23 or equivalent device may be employed for imparting the oscillating movement to the film advancing member, said member having an arm 24 carrying the roll 25 which engages the cam. The parts are so proportioned that the shutter will produce two exposures to each cycle of operation, it being evident that one exposure will be made during the down stroke of the shutter and another exposure during the up stroke of the shutter. The film advancing means is timed to act after each of these exposures, at a time when the exposure opening is covered by one of the shutter blades. The film advancing means thus advances the film twice to each reciprocation of the shutter.

It will be noted that with the form in the invention illustrated in Fig. 1, when the shutter blades are adjusted to change the size of the light aperture, the wrist pin will be shifted, thereby altering the point of leverage exerted on the shutter arms, with the result that the speed of movement of the shutter will be changed with respect to the movement of the film advancing means or other parts of the machine. For instance, when in this figure the wrist pin is shifted by means of a movable member inward or toward the exposure opening, the pin moving in the intersecting slots will draw the shutter blades together and at the same time the distance between the wrist pin and the fulcrum point 3 of the shutter will be increased. This increased distance between the fulcrum and the point of applied power will cause the shutter to be moved slower. Thus in this form of the invention, when the size of the light aperture is decreased the speed of movement of the shutter will be reduced. I find it more advantageous, however, to increase the speed of the movement of the shutter as the size of the light aperture is decreased, and for this purpose I have devised that form of the apparatus shown in Fig. 4. In this form the shutter blades cross each other in the manner illustrated, so that when the wrist pin is moved inwardly and the rate of movement of the shutter is reduced, the size of the exposure opening is increased. On the other hand, when the wrist pin is shifted toward the fulcrum point and the speed of the shutter is increased, then the size of the light aperture is reduced. This feature of altering the speed of movement of the shutter is not confined solely to a camera shutter, as I may adapt this same idea to the shutter of a projector. The claims on this feature are to be construed in this light.

What is claimed, is:

1. In a camera a pair of oscillating shutter blades mounted upon a common axis, said blades being spaced apart and a common means for adjusting said blades while in operation.

2. In a camera a pair of shutter blades mounted upon a common axis, said blades being spaced apart and a common means for adjusting said blades, said means adapted to simultaneously adjust said blades.

3. A shutter for moving picture machines comprising shutter arms pivoted on a common center, shutter blades carried by said arms, means for bodily oscillating the arms and the blades carried thereby, and an adjustable connection between the arms for varying the distance between the blades.

4. A shutter for moving picture machines comprising two shutter blades with their adjacent edges spaced apart to constitute a light aperture therebetween, means for bodily vibrating said shutter blades, and means for adjusting the shutter blades toward and away from each other to vary the size of the light aperture.

5. A shutter for moving picture machines comprising two shutter blades pivoted on a common center with their adjacent edges spaced apart to constitute a light aperture therebetween, means for adjusting said blades toward and away from each other to vary the size of the light aperture, and means for bodily oscillating the shutter blades about the said common center.

6. In combination with a moving picture machine provided with an exposure opening, a shutter comprising a pair of shutter blades pivoted on a common center, with their adjacent edges spaced apart to provide a light aperture therebetween, means for bodily oscillating the shutter blades on the common center to carry the light aperture past the exposure opening, and means for adjusting the blades toward and away from each other during the movement thereof to vary the size of the light aperture.

Signed at New York city in the county of New York and State of New York this 14 day of December A. D. 1910.

GEORGE W. BINGHAM.

Witnesses:
LAURA E. SMITH,
PHILIP S. MCLEAN.